United States Patent [19]

Haraschima

[11] Patent Number: 5,304,992
[45] Date of Patent: Apr. 19, 1994

[54] METHOD OF ALLOCATING IDENTIFIERS AND APPARATUS FOR THE SAME

[75] Inventor: Shuuji Harashima, Yokohama, Japan

[73] Assignee: Kabushiki Kaisha Toshiba, Kawasaki, Japan

[21] Appl. No.: 791,306

[22] Filed: Nov. 14, 1991

[30] Foreign Application Priority Data

Nov. 16, 1990 [JP] Japan .................................. 2-311199

[51] Int. Cl.⁵ ........................ H04Q 11/08; H04J 3/24; H04L 29/06; G08C 15/06
[52] U.S. Cl. .......................... 340/825.52; 340/825.07; 370/85.1; 370/85.3; 370/85.4; 370/85.5; 370/92
[58] Field of Search .............. 340/505, 825.07, 825.22, 340/825.52, 825.05, 825.06, 825.2, 825.5, 825.51, 825.08, 825.65; 370/85.4, 91, 92, 93, 94.2, 94.3, 85.7, 85.11, 85.1, 85.3, 85.5

[56] References Cited

U.S. PATENT DOCUMENTS

| | | | |
|---|---|---|---|
| 4,232,294 | 11/1980 | Burke et al. | 340/825.52 |
| 4,689,786 | 8/1987 | Sidhu et al. | |
| 4,825,204 | 4/1989 | Nakamura | 340/825.52 |
| 4,847,834 | 7/1989 | Bryant | 340/825.07 |
| 4,912,627 | 3/1990 | Ashkin et al. | 340/825.52 |
| 5,029,209 | 7/1991 | Strong, Jr. et al. | 340/825.52 |

Primary Examiner—Donald J. Yusko
Assistant Examiner—Mark H. Rinehart
Attorney, Agent, or Firm—Banner, Birch, McKie & Beckett

[57] ABSTRACT

In a distributed system where a plurality of sites broadcast data using a common communication line for data processing, the object site is identified by its unique identifier. When multiple sites are newly participating in the distributed system in operation, unique identifiers are allocated to the individual new sites.

11 Claims, 7 Drawing Sheets

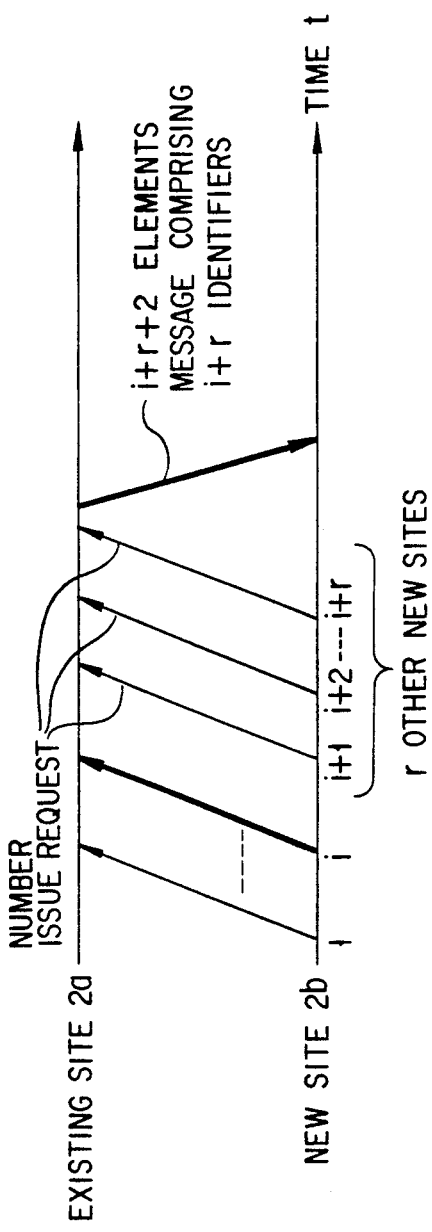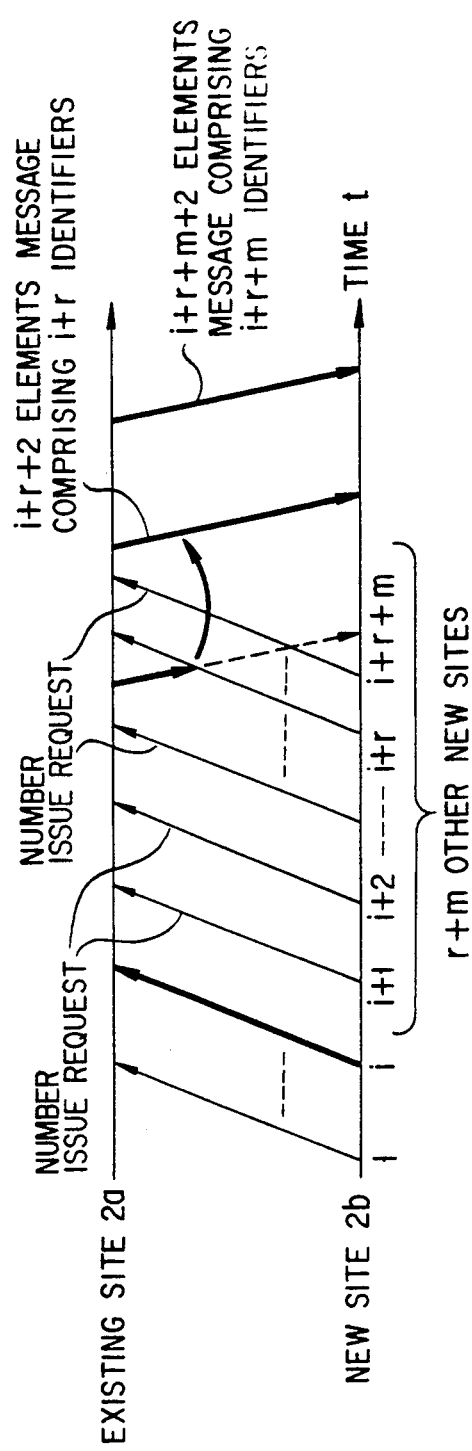

METHOD OF ALLOCATING IDENTIFIERS AND APPARATUS FOR THE SAME

BACKGROUND OF THE INVENTION

1. Field of the Invention

The present invention relates to a method of allocating identifiers for use in a distributed system using a LAN based on a broadcasting communication method such as a typical ETHERNET local area network and an apparatus for the same.

2. Description of the Related Art

A distributed system using a local area network (LAN) is typical of distributed or parallel processing systems having a plurality of computers. In such a distributed system, the physical distances between computers (sites) constituting the system are limited to a relatively short distance. However, since the system of this type not only provides a communication line with a sufficient capacity but also allows use of most existing techniques, systems can be easily constructed. For this reason, the distributed system using a LAN have been developed in various places and put to practical use. In a distributed system, an identifier such as a site number, i.e., a unique number assigned to each site, is generally used to identify each site. Under this site identifying method, it is required that a new identifier is allocated to a new site when the new site enters the system.

Various conventional methods of allocating identifiers have been proposed. Those conventional identifier allocation methods are based on the assumption that the individual sites are physically connected to each other with n(n—1)/2 number of lines where n is the number of sites and, for example, that site i can communicate only with site j by specifying a communication port of the site j through one of the lines.

However, since, in the distributed system using a LAN based on a broadcasting communication method such as ETHERNET, each site broadcasts the same information to the other sites, the above assumption will not hold. Therefore, conventional identifier allocation methods cannot be applied to LAN-based distributed systems. This is because, in such distributed systems, new sites to which no identifiers have been assigned enter into the system almost at the same time, and it is impossible to inform each new site separately of the identifier assigned to that new site through the communication line. That is, in conventional identifier allocation methods, only one site to which no identifier has been assigned can exist at the same time in the distributed system. For this reason, in the system using the LAN based on the broadcasting communication method, for example, newly entering sites have been assigned identifiers beforehand and the users activate the desired sites using the assigned identifiers. This conventional method requires much time to allocate the identifiers and also raises some problems such as issuing duplicate identifiers and vulnerability to unauthorized entering.

SUMMARY OF THE INVENTION

Accordingly, an object of the present invention is to provide a method of allocating identifiers to new sites even when a plurality of new sites enter almost at the same time a system which is in operation and composed of a plurality of sites having the same broadcasting and receiving functions, and an apparatus for the same.

According to an aspect of the present invention, there is provided a method of allocating identifiers to individual sites in a communication system where a plurality of sites are connected to each other through a communication line and data communication which uses exclusively the communication line is carried out by specifying an object site using a unique identifier allocated to the object site, comprising the steps of broadcasting, from each new site participating in the communication system, an identifier issue request on the communication line broadcasting, from one of the existing sites which received the identifier issue requests on the communications line, an identifier string of unique identifiers not yet allocated and arranged in the order of the issue requests on the communication line and counting, at each new site, the number of identifier issue requests broadcasted from other new sites during the time from when that new site broadcasts the identifier issue request until it receives the identifier string, and selecting the unique identifier allocated to itself from the identifier string based on the count According to another aspect of the present invention, there is provided a method of allocating identifiers to individual sites in a communication system where a plurality of sites are connected to each other through a communication line and data communication which uses exclusively the communication line is carried out by specifying a object site using a unique identifier allocated to the object site, comprising the steps of broadcasting, from each site newly participating in the communication system, an identifier issue request on the communication line, broadcasting, from one of the existing sites that has received the identifier issue request on the communication line, a first identifier string of unique identifiers not yet allocated and arranged in the order of the issue requests on the communication line, counting, from the existing site, the number of identifier issue requests received from other new sites during the time from when the existing site has received the previous identifier issue request until it broadcasts the first identifier string, and broadcasting, from the existing site, a second identifier string composed of as many identifiers as the count added to the first identifier string onto the communication line and counting the number of identifier issue requests from the other new sites by each new site during the time from when each new site broadcasts the identifier issue request until it receives the second identifier string, and selecting, at each new site, the unique identifier allocated to itself from the second identifier string based on the count.

According to still another aspect of the present invention, there is provided an apparatus for allocating identifiers to individual sites for use in a communication system where a plurality of sites are connected to each other through a communication line and a data communication which uses exclusively the communication line is carried out by specifying an object site using a unique identifier allocated to the object site, comprising means for connecting each site to the communication line, monitoring communications on the communication line, and broadcasting and receiving data through the communication line, means for broadcasting a site identifier issue request through the connecting means to the communication line, means for counting the number of site identifier issue requests broadcasted from new sites to the communication line until each new site receives an identifier string after the new site broadcasts a site identifier issue request, means for verifying the sequence of site identifier issue requests broadcasted on the communication line, means for arranging an identifier message under the control of the verifying means, and issuing the identifier message on the communication line through the connecting means, and means for selecting unique identifier allocated to the new site from the identifier message received from the communication line under the control of the counting means.

With the present invention, an identifier issuing site receives identifier issue requests broadcasted from other new sites during the time from when it has received an identifier issue request from a new site until it broadcasts a unique identifier, counts the number of the identifier issue requests, and broadcasts as many identifiers as the count. At the same time, the new site counts the number of identifier issue requests broadcasted from the other new sites during the time from when it has broadcasted an identifier issue request until it receives a unique identifier, and selects a unique identifier allocated to itself based on the count. Therefore, it is possible to allocate identifiers even when a plurality of new sites almost simultaneously participate in the system in operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 4 and 5 are diagrams for explaining respectively the procedures of allocating identifiers with respect to time;

DETAILED DESCRIPTION OF THE PREFERRED EMBODIMENT

A method of allocating identifiers and an apparatus for the same according to the present invention will be explained referring to the accompanying drawings.

Figure 1:
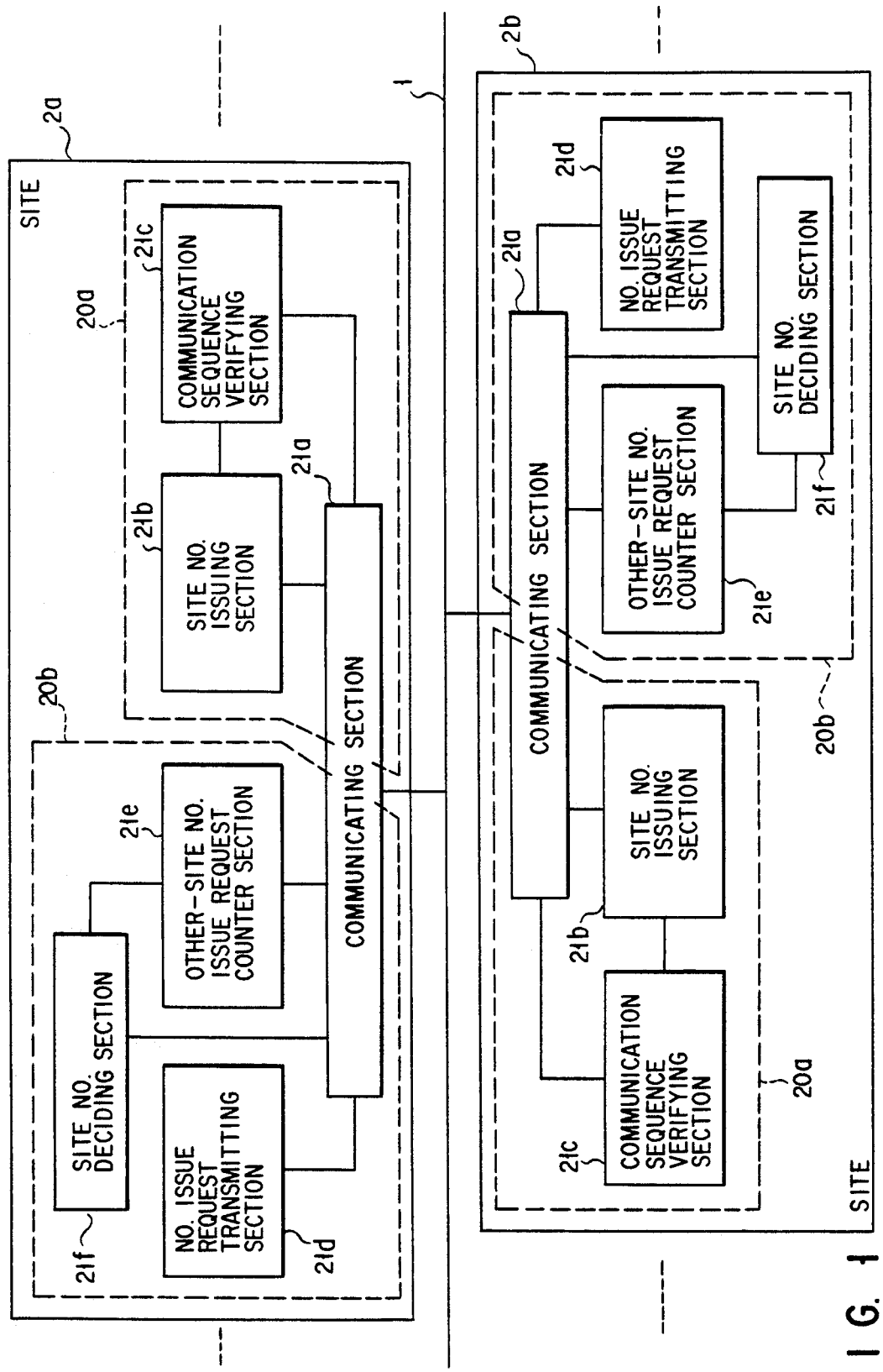
FIG. 1 is a block diagram showing a part of an apparatus for allocating identifiers according to an embodiment of the present invention.

FIG. 1 is a block diagram showing a part of an apparatus for allocating identifiers according to the embodiment of the present invention. For a communication system to which the present invention is applied, it is assumed that the system operates using a broadcasting communication method like ETHERNET when it is in communication without specifying a site number and that as long as a communication is in progress, the communication uses exclusively the communication line to prohibit any other communications. It is also assumed that the system is equipped with a collision avoidance means of communications on the communication line. In the present invention, site numbers are considered to be identifiers hereinafter.

As shown in FIG. 1, a plurality of sites 2 with equal transmitting and receiving functions are connected to a communication line (bus) 1. The sites 2a have already been assigned unique site numbers serving as identifiers and have participated in the communication system (referred to as the existing sites hereinafter). On the other hand, sites 2b have not been assigned unique site numbers yet and are about to participate in the communication system (referred to as new sites hereinafter). For the sake of simplicity, only one existing site 2a and one new site 2b are shown in FIG. 1. The existing site 2a comprises an identifier issuing section 20a having the function of issuing new site numbers, and an identifier issue request section 20b having the function of requesting the issue of a new site number. The identifier issuing section 20a includes a communicating section 21a for connecting the site to the communication line 1 and always monitoring communications on the communication line 1, a site number issuing section 21b for forming and issuing a site number message for the new sites 2b, and a communication sequence verifying section 21c for verifying and storing the sequence of identifier issue requests which a plurality of new sites 2b have broadcasted on the communication line 1. The identifier issue request section 20b includes the communicating section 21a described above, a number issue request transmitting section 21d for broadcasting site number issue requests for its own site on the communication line 1, an other-site number issue request counting section 21e for counting the number of number issue requests broadcasted by the other sites during the time from when its own site broadcasts a number issue request to the communication line 1 until it receives an identifier message, and a site number selecting section 21f for deciding its own site number from the sequence of identifiers received on the basis of the output of the other-site number issue request counting section 21e. For simplicity's sake, a description of the remaining construction necessary for data broadcast and reception over a LAN will be omitted. Although the new site 2b has the same construction as that of the existing site 2a, the identifier issuing section 20a operates in the latter, whereas the identifier issue request section 20b operates in the former. Of the existing sites 2a that have received number issue requests, for example, the site with the smallest site number (address) can broadcast site numbers from its own identifier issuing section 20a. In FIG. 1, all existing sites 2a have the same construction with a number issuing function, but they may be logically constructed so that only a particular single existing site 2a may execute a site number issuing function.

Figure 2A:
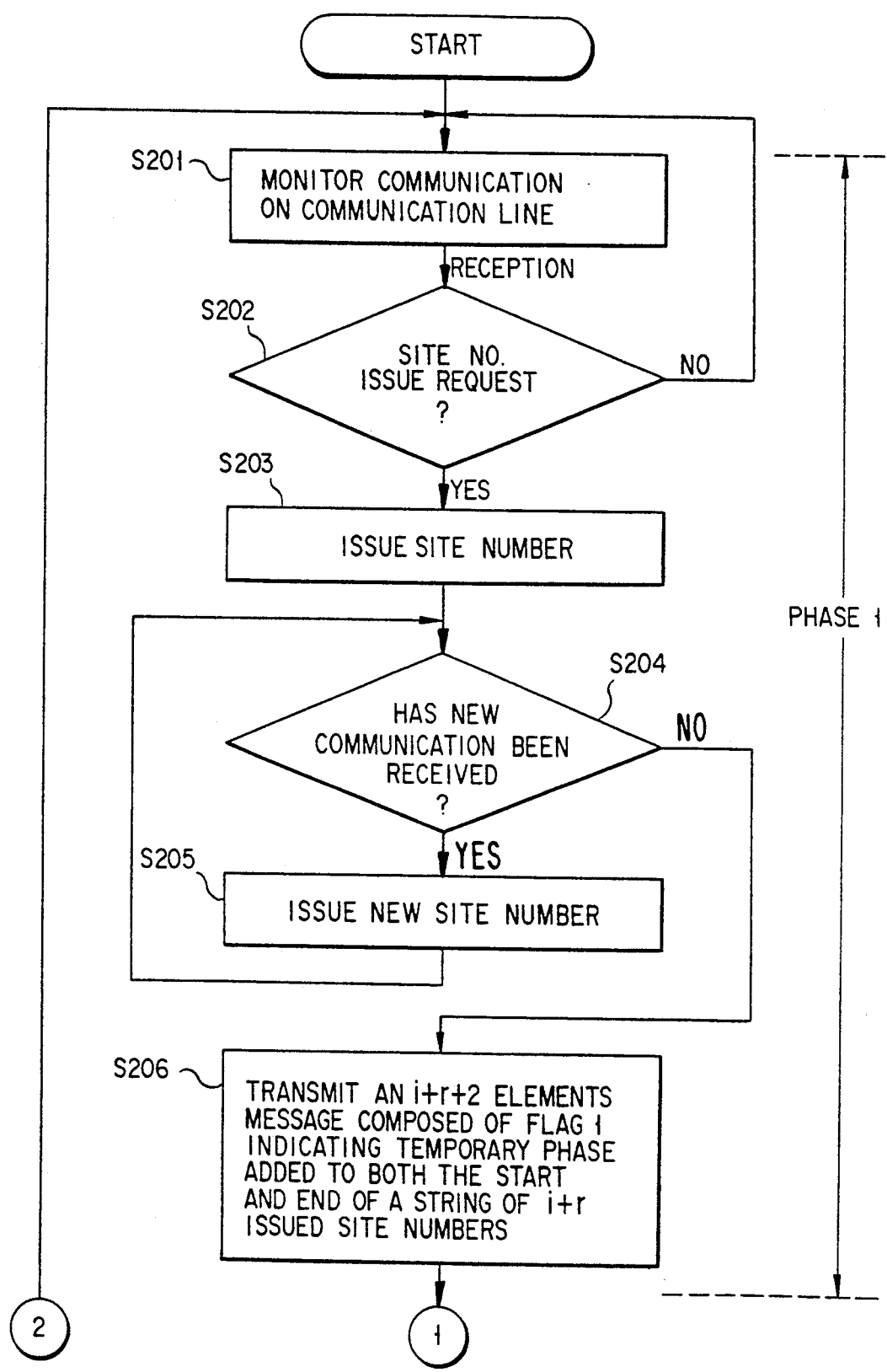
FIGS. 2A and 2B are flowcharts for explaining procedures of allocating identifiers in an existing site of FIG. 1 when taken together.
Figure 2B:
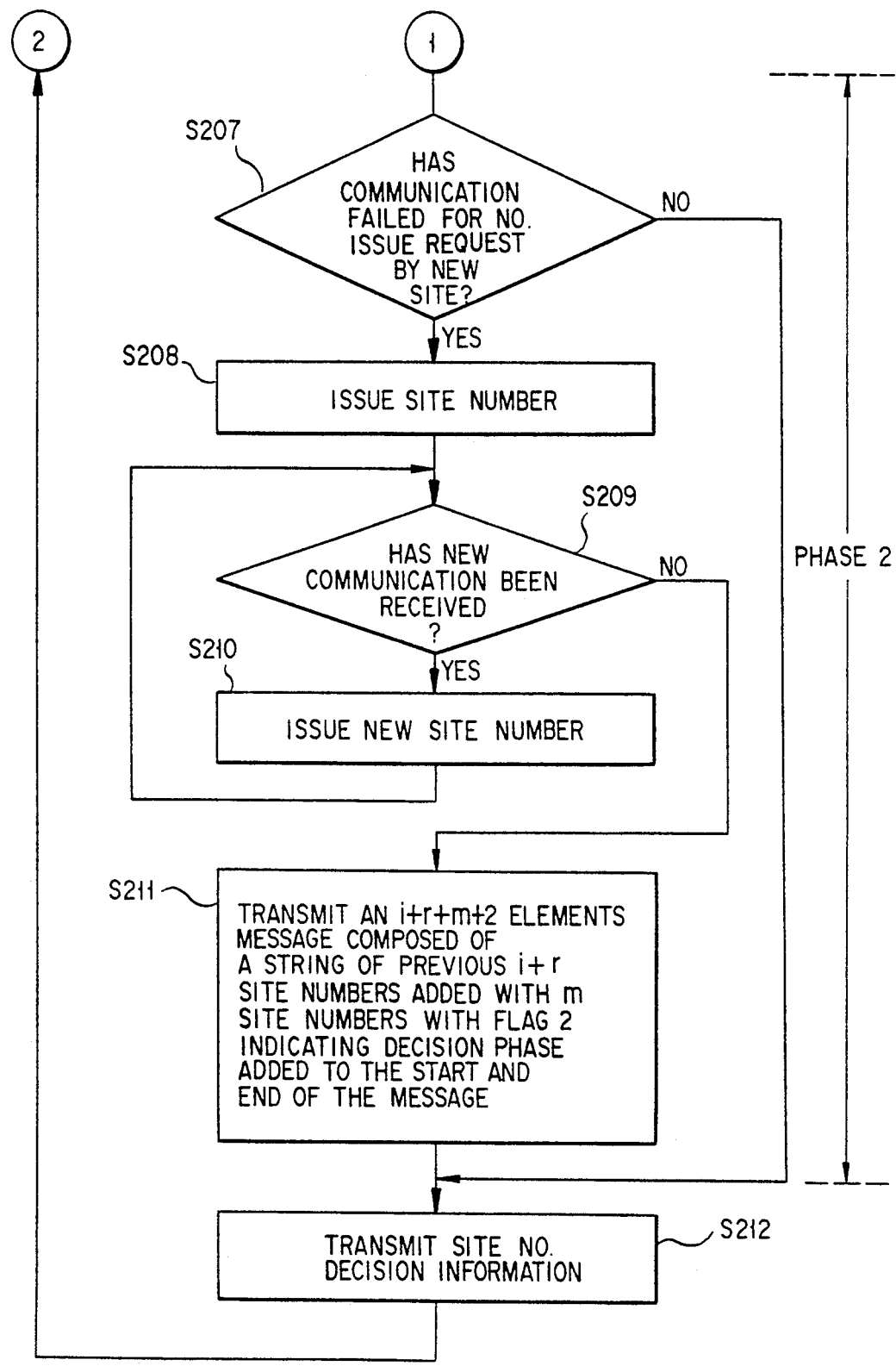
Figure 6:
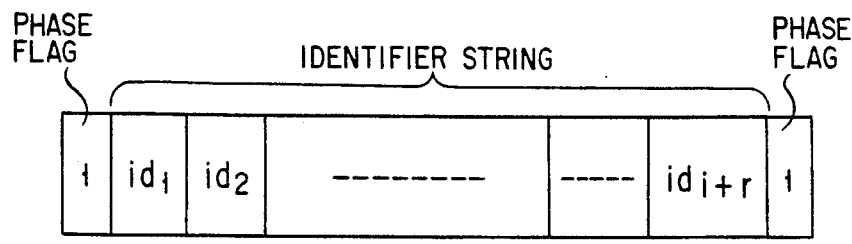
FIG. 6 is a diagram showing an identifier string issued from the existing site.

FIGS. 2A and 2B are flowcharts for explaining procedures of allocating identifiers in an existing site 2a of FIG. 1. Any number issuing method may be used as long as a number other than the numbers already allocated to the other sites in the system can be issued. For example, there is a method in which a number is incremented one by one. In FIG. 2A, after the system is started, the communicating section 21a in the existing site 2a always monitors the communications on the communication,, line 1 (S201). The site number issuing section 21b determines whether the monitored communications are site number issue requests (S202). If none has been received, the communicating section 21a continues monitoring the communications on the communication line, 1 (S201). On the other hand, when one has been received, the site number issuing section 21b prepares for response, issuing, a site number (S203). Then, for example, as shown in FIG. 4, it is determined whether the communicating section 21a of the existing site 2a has received number issue requests from r other new sites 2b added to the communication system during the time from when the i th new site 2b broadcasts a number issue request at step S202 until the existing site 2a issues a new site number (S204). If new site number issue requests have been received, the site number issuing section 21b of the existing site 2a issues site numbers in response to the number issue requests under the control of the communication sequence verifying section 21c (S205). When no more requests have been received, the site number issuing section 21b issues site numbers in the order the requests were received to form an identifier string of total i+r site numbers. Then, as shown in FIG. 6, the section 21b broadcasts as a response an i+r+2 elements message where phase flag "1" (i.e., phase "1") representing a temporary phase of the site number is added to both the beginning and end of the site number 25 string (S206). The i+r+2 elements message is defined as a message consisting of i+r+2 elements, the sum of i+r identifiers and two phase flags. The communicating section 21a broadcasts the message through the communication line 1.

Figure 7:
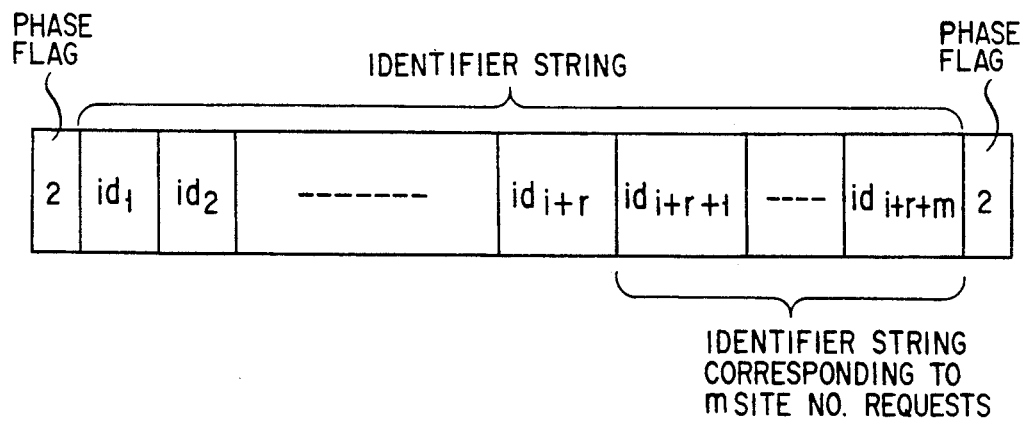
FIG. 7 is a diagram showing another identifier string issued from the existing site.

Referring to FIG. 2B, an explanation will be made of the collision in the existing site 2a of the number issue request broadcasted from the new site 2b and the site number broadcasted from the existing site 2a when another m new sites 2b broadcast number issue requests as shown in FIG. 5, during the time from when the site number issuing section 21b of the existing site 2a requests the communicating section 21a to broadcast an i+r+2 elements message to the communication line 1 until the message is broadcasted to the communication line 1. In FIG. 2B, when another m new sites 2b broadcast number issue requests after i+r new sites have broadcasted the number issue requests, it is determined whether the broadcasting of an i+r+2 elements message to the communication line 1 from the communication section 21a has failed by a collision due to m number issue requests (S207). If the transmission fails for that m number issue requests, new site numbers are issued in the same procedures as described above (S208, S209, S210). As a result, the site number issuing section 21b of the existing site 2a adds a string of the current m site numbers to the previous string of i+r site numbers under the control of the communication sequence verifying section 21c, and then further adds phase flag "2" to both the beginning and end of the resulting site number string to broadcast as a response an i+r+m+2 elements message, as shown in FIG. 7. Then, the communicating section 21a of the existing site 2a rebroadcasts the message onto the communication line, 1 (S208). Site number decision information is broadcasted to the communication line 1. Phase flag "2" indicates that the site numbers in the site number string are the final decisions for the individual sites. The sensing of collisions and rebroadcasting of site number strings are automatically executed by the hardware of the existing site 2a. The new sites 2b can know from the value "2" of the phase flag that the rebroadcasting has been executed. Following step S208 or at step S207, when there is no collision or failure in broadcasting, site number decision information is broadcasted to the communication line 1 (S212). This completes the procedures of allocating identifiers at the existing site 2a.

Figure 3A:
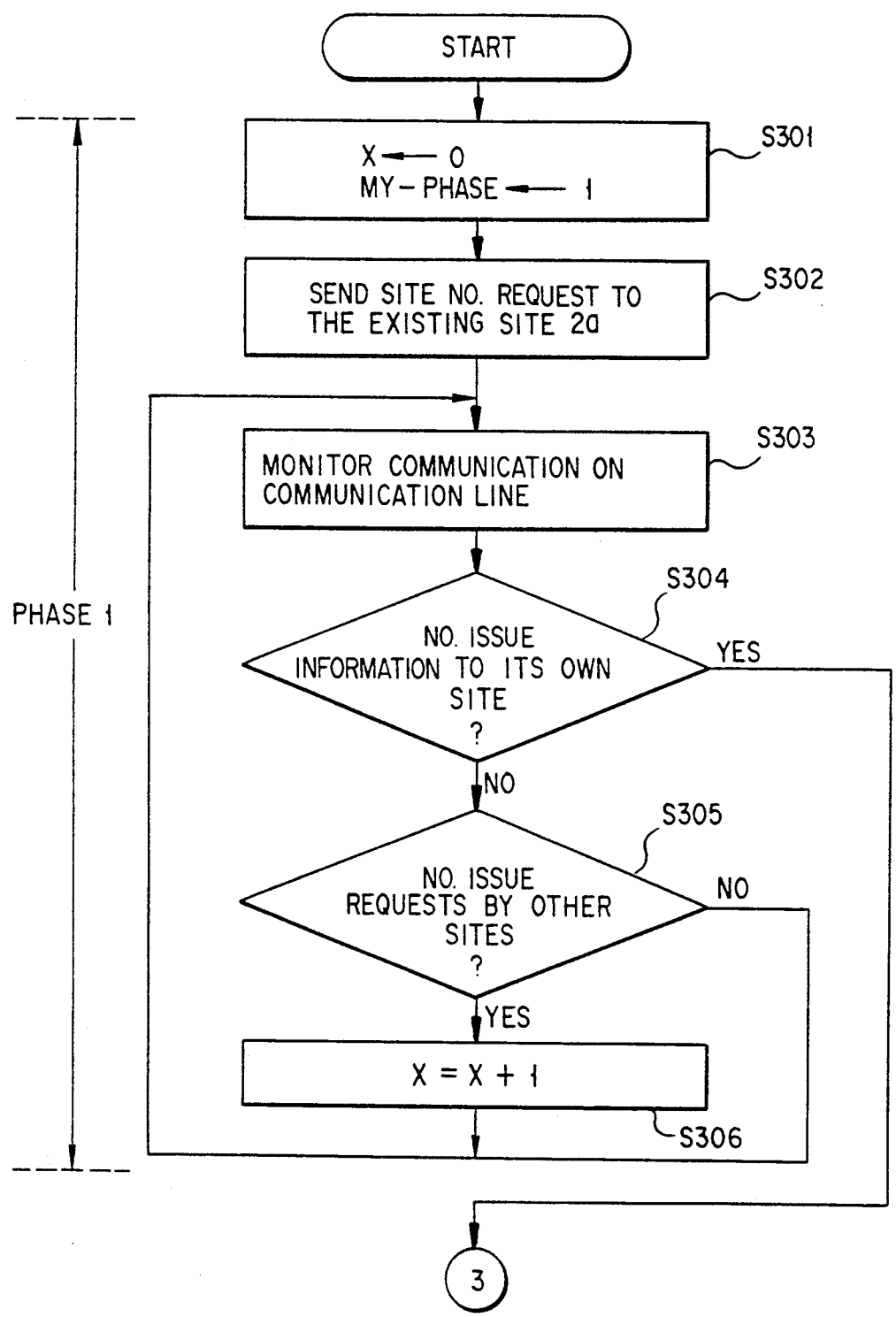
FIGS. 3A and 3B are flowcharts for explaining procedures of allocating identifiers in a new site of FIG. 1 when taken together.
Figure 3B:
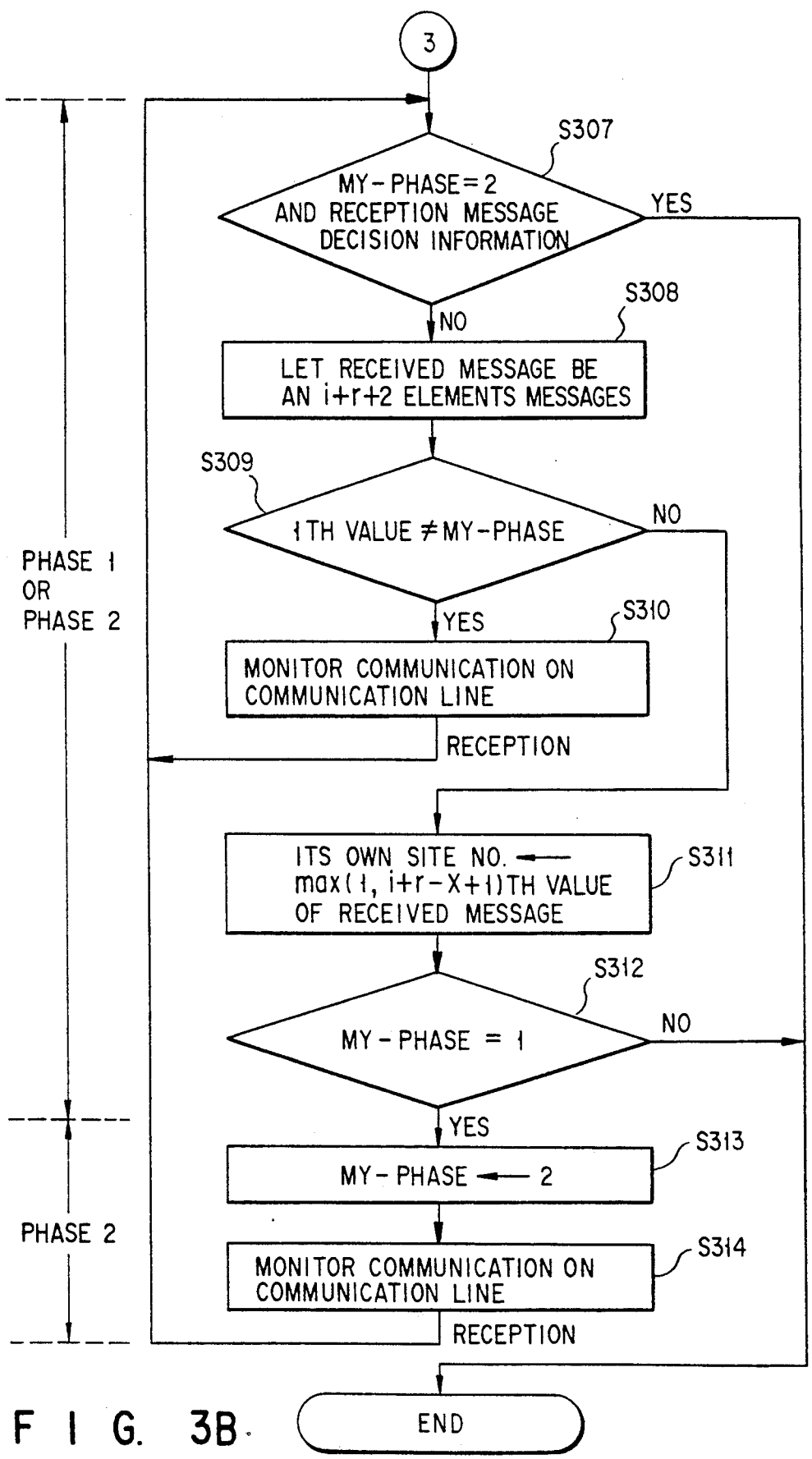

FIGS. 3A and 3B are flowcharts for explaining procedures of allocating identifiers in a new site 2b of FIG. 1. In FIG. 3A, the new site 2b initializes the count X of its other-site number issue request counting section 21e to "0" before requesting the issue of a site number and sets its phase flag (my phase) to "1" in order to indicate that the site number allocating procedure is in an initial stage (S301). After this, the number issue request section 21d broadcasts a site number issue request to the existing site 2a via the communicating section 21a and communication line 1 (S302). The communicating section 21a of the new site 2b starts to monitor the communications on the communication line 1 in order to receive a response message from the exiting site 2a (S303). The communicating section 21a determines whether there is number issue information for its own new site 2b in the monitored message (S304). That is, it is determined whether the value of the phase flag in the first number is "1". If it is not true, when the other new sites 2b broadcasts the site number issue requests (S305), the other-site number issue request counting section 21e counts the number of those site number issue requests, replacing the count X with X+1 each count (S306). When there are no number issue requests from the other sites, it waits until number issue information for its own new site 2b is received (S304).

In FIG. 3B, when the existing site 2a broadcasts again a temporarily allocated site number in the procedure explained in FIG. 2A, it is determined whether the phase flag (my phase) is "2" and the received message includes site number decision information (S307). If the decision information is included, the procedures are completed. If not, the received message is made to be an i+r+2 elements message composed of i+r site numbers allocated to the new sites including itself and two phase flag "1"s (S308). Here, it is determined whether the communication section 21a has received the message whose phase flag is "2" (S309). When the phase flag is "1", monitoring the communications on the communication line 1 is continued (S310). On the other hand, when the message whose phase flag is "2" is received at step S309, the site number deciding section 21f searches for its own site number candidate based on the count X of the counter corresponding to the number of the number issue requests broadcasted by the other sites (S311). As shown in FIG. 6, it is assumed that the i+r−X+1 th number from the beginning of the i+r+2 elements message, i.e., the X+2 th number from the end of the message is a temporary site number allocated to its own new site 2b. Here, it is determined whether the phase flag (my phase) is "1" (S312). When the phase flag is "2", the procedures are completed. On the other hand, when the phase flag is "1", the message is ignored. Because the procedures proceed to a final decision step, its own phase flag is set to "2" (S313). The communicating section 21a restarts to monitor the communications on the communication line 1 (S314). In this state, procedures go back to step S307, awaiting reception message decision information from the existing site 2a to come because the phase flag is "2". The same procedures are repeated until decision information is received. At step S307, when decision information is received, it is determined that the site number obtained until then is its own site number. This completes the process.

With the present invention, it is possible to allocate site numbers even when a plurality of new sites participate in the communication system in operation. Because both the new sites and the existing sites can check the identifiers and also check the number of participants using a counter, an unauthorized entry in the communication system can be prevented.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of allocating identifiers to individual newly participating sites in a communication system where a plurality of existing sites are connected to each other through a communication line and a communication between the sites using exclusively said communication line is carried out by specifying an object site using a unique identifier allocated to said object site, the method comprising the steps of:
   broadcasting an identifier issue request on said communication line by each newly participating site;
   receiving said identifier issue request on said communication line by said existing sites;
   broadcasting an identifier string of unique identifiers not yet allocated and arranged in transmission order of said identifier issue requests on said communication line by one of said existing sites;
   counting the number of identifier issue requests broadcasted from other new sites by each new site during the time from when that new site broadcasts said identifier issue request until it receives said identifier string; and
   selecting the unique identifier allocated to itself from said identifier string based on the count by each new site.

2. A method of allocating identifiers to individual newly participating sites in a communication system where a plurality of existing sites are connected to each other through a communication line and a communication between the sites using exclusively said communication line is carried out by specifying an object site using a unique identifier allocated to said object site, the method comprising the steps of:
   broadcasting an identifier issue request on said communication line by one newly participating site;
   receiving said identifier issue request on said communication line by said existing sites;
   broadcasting a first identifier string of unique identifiers not yet allocated and arranged in transmission order of said identifier issue requests on said communication line by one of said existing sites;
   counting the number of identifier issue requests by said one of said existing sites when receiving identifier issue requests from other newly participating sites during the time from when said one of said existing sites has received said previous identifier issue request until it broadcasts said first identifier string;
   broadcasting a second identifier string composed of as many identifiers as the count added to said first identifier string to said communication line by said one of said existing sites;
   counting the number of identifier issue requests from said other newly participating sites by said one newly participating site during the time from when each new site broadcasts said identifier issue request until it receives said second identifier string; and
   selecting the unique identifier allocated to itself from said second identifier string based on the count by said one newly participating site.

3. An apparatus for allocating identifiers to individual newly participating sites for use in a communication system where a plurality of existing sites are connected to each other through a communication line and a communication between the sites using exclusively said communication line is carried out by specifying an object site using a unique identifier allocated to said object site, said apparatus comprising:
   means for connecting each site to said communication line;
   means for monitoring communications on said communication line;
   means for broadcasting and receiving data through said communication line;
   means for broadcasting a site identifier issue request through said connecting means to said communication line when own site newly participates in said communication system;
   means for receiving said identifier issue request on said communication line by said existing sites;
   means for counting the number of site identifier issue requests broadcasted from other newly participating sites to said communication line until its own newly participating site receives an identifier string after said newly participating site broadcasts a site identifier issue request;
   means for verifying the sequence of site identifier issue requests broadcasted on said communication line;
   means for arranging an identifier message under the control of said verifying means;
   means for issuing an arranged identifier message on said communication line through said connecting means; and
   means for deciding a unique identifier allocated to said own newly participating site from said arranged identifier message received from said communication line under the control of said counting means.

4. An apparatus for allocating identifiers to sites in a system having a plurality of sites connected to a communication line, said apparatus comprising:
   first broadcasting means for broadcasting a site identifier issue request to a predetermined site over said communication line;
   receiving means, connected to said communication line, for receiving messages transmitted on said communication line;
   monitoring means, coupled to said receiving means, for monitoring site identifier issue requests broadcasted on said communication line;
   first detecting means, coupled to said receiving means, for detecting reception of a site identifier string from said predetermined site, said site identifier string comprising a plurality of unique site identifiers each corresponding to a particular one of said plurality of sites;

counting means, responsive to said monitoring means, said first broadcasting means, and said first detecting means, for counting a number of said site identifier issue requests monitored by said monitoring means during a time period between when said first broadcasting means broadcasts said site identifier issue request and when said first detecting means detects reception of said site identifier string; and selecting means, responsive to said counting means, for selecting one of said plurality of unique site identifiers, corresponding to said number, from said site identifier string.

5. The apparatus of claim 4, further comprising:

second detecting means, coupled to said receiving means, for detecting when a site identifier issue request has been received;

site issuing means, responsive to said second detecting means, for issuing said plurality of unique site identifiers;

ordering means, coupled to said site issuing means, for ordering said plurality of unique site identifiers and forming said site identifier string thereby; and second broadcasting means, coupled to said ordering means and connected to said communication line, for broadcasting said site identifier string.

6. The apparatus of claim 5, wherein said ordering means orders said plurality of unique site identifiers according to an order in which a plurality of said site identifier issue requests have been received.

7. The apparatus of claim 6, wherein said site identifier string includes a phase flag to indicate a phase of communication among the said plurality of sites.

8. An apparatus for allocating identifiers to sites in a system having a plurality of sites connected to a communication line, said apparatus comprising:

receiving means, connected to said communication line, for receiving site identifier issue requests broadcast on said communication lie and determining an order in which said site identifier issue requests are received;

site identifier issuing means, responsive to said receiving means, for issuing a unique site identifier for each of said site identifier issue requests received by said receiving means;

first ordering means, coupled to said site identifier issuing means and to said receiving means, for ordering a first group of said unique site identifiers corresponding to said order in which said site identifier issue requests are received during a first time interval, and producing a site identifier string thereby; and first broadcasting means, coupled to said first ordering means, for broadcasting said site identifier string on said communication line.

9. The apparatus of claim 8, further comprising:

collision detection means, coupled to said receiving means, for detecting a condition that additional of said site identifier requests are received during a second time interval beginning after a time that said site identifier issuing means issues a last of said unique site identifier issue requests corresponding to said first group;

second ordering means, coupled to said site identifier issuing means and to said receiving means and responsive to said collision detection means, for ordering a second group of said unique site identifiers corresponding to said order in which said site identifier issue requests are received during said second time interval and combining said second group with said first group, thereby producing a second site identifier string; and second broadcasting means, responsive to said second ordering means and connected to said communication line, for broadcasting said second site identifier string on said communication line.

10. The apparatus of claim 9, wherein said second site identifier string comprises a phase flag set to indicate that said collision detection means has detected a collision.

11. A method of allocating identifiers to sites in a communication system comprising a plurality of new sites and an existing site having a unique identifier, each site being coupled through a communication line, the method comprising the steps of:

broadcasting, from said plurality of new sites, identifier issue requests on said communication line to said existing site;

receiving, at said existing site, said identifier issue requests and determining an order in which said identifier issue requests are received;

issuing, at said existing site, a plurality of unique identifiers corresponding to said identifier issue requests;

broadcasting, from said existing site, an identifier string including said plurality of unique identifiers arranged in said order;

monitoring, at each of said new sites, said communication line for said identifier issue requests;

receiving, at each of said new sites, said identifier string;

counting, at one of said new sites, the number of said identifier issue requests broadcasted from said plurality of new sites excluding said one new site during a time from when said one new site broadcasted a corresponding one of said identifier issue requests and a time when said identifier string is received at said one new site; and selecting, at said one of said new sites, one of said unique identifiers from said identifier string corresponding to said number of said identifier issue requests.

* * * * *